United States Patent
Lee

(10) Patent No.: US 10,579,036 B2
(45) Date of Patent: Mar. 3, 2020

(54) APPARATUS FOR PROGRAM MANAGEMENT OF PROGRAMMABLE LOGIC CONTROLLER

(71) Applicant: LSIS CO., LTD., Anyang-si, Gyeonggi-do (KR)

(72) Inventor: Sang Hun Lee, Gunpo-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 567 days.

(21) Appl. No.: 14/712,666

(22) Filed: May 14, 2015

(65) Prior Publication Data

US 2015/0331407 A1    Nov. 19, 2015

(30) Foreign Application Priority Data

May 19, 2014  (KR) .......................... 10-2014-0059503

(51) Int. Cl.
    *G05B 19/05*    (2006.01)

(52) U.S. Cl.
    CPC .. *G05B 19/056* (2013.01); *G05B 2219/13153* (2013.01); *G05B 2219/15065* (2013.01)

(58) Field of Classification Search
    CPC ........................... G06F 11/3664; G05B 19/056
    See application file for complete search history.

(56) References Cited

U.S. PATENT DOCUMENTS

| | | | | |
|---|---|---|---|---|
| 7,110,837 B2 * | 9/2006 | Oka | ...................... | G05B 19/056 700/18 |
| 7,624,247 B2 * | 11/2009 | Lee | ...................... | G06F 9/4428 707/999.202 |
| 2004/0073404 A1 * | 4/2004 | Brooks | ................ | G05B 19/409 702/183 |
| 2004/0230322 A1 | 11/2004 | Oka et al. | | |

(Continued)

FOREIGN PATENT DOCUMENTS

| | | |
|---|---|---|
| CN | 1604051 A | 4/2005 |
| CN | 101295169 A | 10/2008 |

(Continued)

OTHER PUBLICATIONS

European Patent Office Application Serial No. 15167613.7, Search Report dated May 30, 2016, 8 pages.

(Continued)

*Primary Examiner* — Lewis A Bullock, Jr.
*Assistant Examiner* — Mohammad H Kabir
(74) *Attorney, Agent, or Firm* — K&L Gates LLP

(57) ABSTRACT

An execution code of a user program applicable to a PLC is fitted and arranged to an adequate block among memory blocks of variable sizes, and execution order and position information of each execution code are downloaded to the PLC along with recorded execution table. A CPU module of PLC sequentially executes each execution code randomly arranged on a memory with reference to the execution table. Because an execution code is loaded on a memory block having respectively different sizes such as N, 2N and 4N, (Continued)

utilization of non-use space can be improved over a conventional allocation method of fixed size. An execution table is utilized to discontinuously configure a program execution area, whereby a user program can be easily modified or added during PLC operation.

4 Claims, 4 Drawing Sheets

(56) References Cited

U.S. PATENT DOCUMENTS

| | | | | |
|---|---|---|---|---|
| 2007/0174826 A1* | 7/2007 | Guarraci | ............... | G06F 11/366 717/140 |
| 2008/0183976 A1* | 7/2008 | Bliss | .................... | G05B 19/056 711/154 |
| 2008/0212683 A1* | 9/2008 | Nakata | .................. | H04N 19/70 375/240.23 |
| 2010/0174876 A1* | 7/2010 | Kasahara | ................ | G06F 8/453 711/154 |
| 2011/0314247 A1* | 12/2011 | Choi | ........................ | H04N 5/44 711/170 |
| 2013/0073779 A1* | 3/2013 | Prasad | .................... | G06F 12/02 711/6 |
| 2013/0128896 A1* | 5/2013 | Munoz | ................ | H04L 49/9078 370/412 |

FOREIGN PATENT DOCUMENTS

| | | |
|---|---|---|
| CN | 101601017 A | 12/2009 |
| DE | 102010027906 | 10/2011 |
| JP | 61-118806 | 6/1986 |
| JP | 2002-333903 | 11/2002 |
| JP | 2003-122410 | 4/2003 |
| JP | 2004295872 | 10/2004 |
| KR | 1020090106613 | 10/2009 |

OTHER PUBLICATIONS

Japan Patent Office Application Serial No. 2015-101999, Office Action dated Mar. 29, 2016, 2 pages.
Korean Intellectual Property Office Application No. 10-2014-0059503, Office Action dated Feb. 20, 2017, 5 pages.
Chinese Office Action for related Chinese Application No. 201510341902.6; action dated Nov. 29, 2017; (7 pages).
Chinese Office Action for related Chinese Application No. 201510341902.6; dated Jul. 24, 2018; (7 Pages).

* cited by examiner

US 10,579,036 B2

APPARATUS FOR PROGRAM MANAGEMENT OF PROGRAMMABLE LOGIC CONTROLLER

CROSS REFERENCE TO RELATED APPLICATIONS

Pursuant to 35 U.S.C.§ 119 (a), this application claims the benefit of earlier filing date and right of priority to Korean Patent Application No. 10-2014-0059503, filed on May 19, 2014, the contents of which are all hereby incorporated by reference in their entirety.

TECHNICAL FIELD

The teachings in accordance with exemplary and non-limiting embodiments of the present disclosure relate generally to an apparatus for user program management of PLC (Programmable Logic Controller) and a CPU (Central Processing Unit) module of PLC, and more particularly, to an apparatus for user program management of PLC configured to more efficiently use a memory space by allocating a memory block adequate to size of user program, and to modify/add an executing user program without stopping an operating PLC.

BACKGROUND ART

A PLC (Programmable Logic Controller) is a factor essential for factory automation, and may be variably used in industrial fields. A user program for PLC may be modified or added as required, and the modified user program must be executed by being downloaded to the PLC. At this time, there is a need to modify or add functions of user program without stopping of control system. To this end, a space (allowance or clearance) is arranged at a memory block mounted on each user program, a modified portion is loaded on the space to enable the user program to be modified even during PLC operation.

However, size of memory block allocated to each user program is conventionally fixed regardless of size of each user program to a disadvantage of deteriorated utilization of non-used space, and to a disadvantage of no more enablement of program modification when there is obtained no space for modifying programs.

DISCLOSURE

Technical Problem

Accordingly, the present invention is provided to solve the aforementioned problems/disadvantages, and therefore, it is an object of the present invention to provide an apparatus for user program management of PLC configured to improve utilization of non-used space by variably forming sizes of memory blocks allocated to each user program, and to realize flexible program modification or addition.

Technical Solution

In order to accomplish the above object, in one general aspect of the present disclosure, there is provided an apparatus for program management of PLC (Programmable Logic Controller), the apparatus comprising:

a compile means configured to generate an execution code by compiling a source code;

a block allocation means configured to allocate a memory block adequate to size of execution code, based on memory configuration information as to what memory blocks a memory is formed with;

link means configured to arrange the execution code at a position of a memory block allocated through the block allocation means;

execution table generation means configured to generate execution table recorded with execution order and position information of each execution code; and download means configured to download the execution code and execution table processed by the link means to the PLC.

Preferably, but not necessarily, the size of the memory block may be formed in integer of preset basic size (N).

Preferably, but not necessarily, the block allocation means may allocate the memory block as it is, or a new memory block in response to the size of the modified execution code and the size of memory block allocated to the execution code prior to modification when a source code is modified.

Preferably, but not necessarily, the size of the memory block size may be formed with an integer of preset basic size (N), where the block allocation means searches an effective memory block by increasing the size by as many as one unit, starting from 'CEIL (modified size of execution code÷N)× N', when CEIL (x) is a function representing a minimum integer number larger than x, Preferably, but not necessarily, the block allocation means may re-allocate a memory block relative to each execution code, based on the memory configuration information, when no new memory block can be found.

Preferably, but not necessarily, the apparatus may further comprise a CPU module of PLC configured to receive the execution code and execution table from the download means, wherein the CPU module sequentially executes the execution code of memory with reference to the execution table.

Advantageous Effects

Exemplary embodiments of an apparatus for program management of PLC according to the present disclosure have an advantageous effect in that a program memory block having respectively different sizes such as N, 2N and 4N is configured and a memory block of a size adequate to the size of user program is allocated. Thus, utilization of non-use space can be improved over a conventional allocation method of fixed size.

Another advantageous effect is that a program execution area can be discontinuously configured by utilizing an execution table, whereby selective execution of program is enabled to modify or add a user program during PLC operation.

BEST MODE

Hereinafter, an apparatus for user program management of PLC according to exemplary embodiments of the present disclosure will be described in detail with reference to the accompanying drawings.

Figure 1:
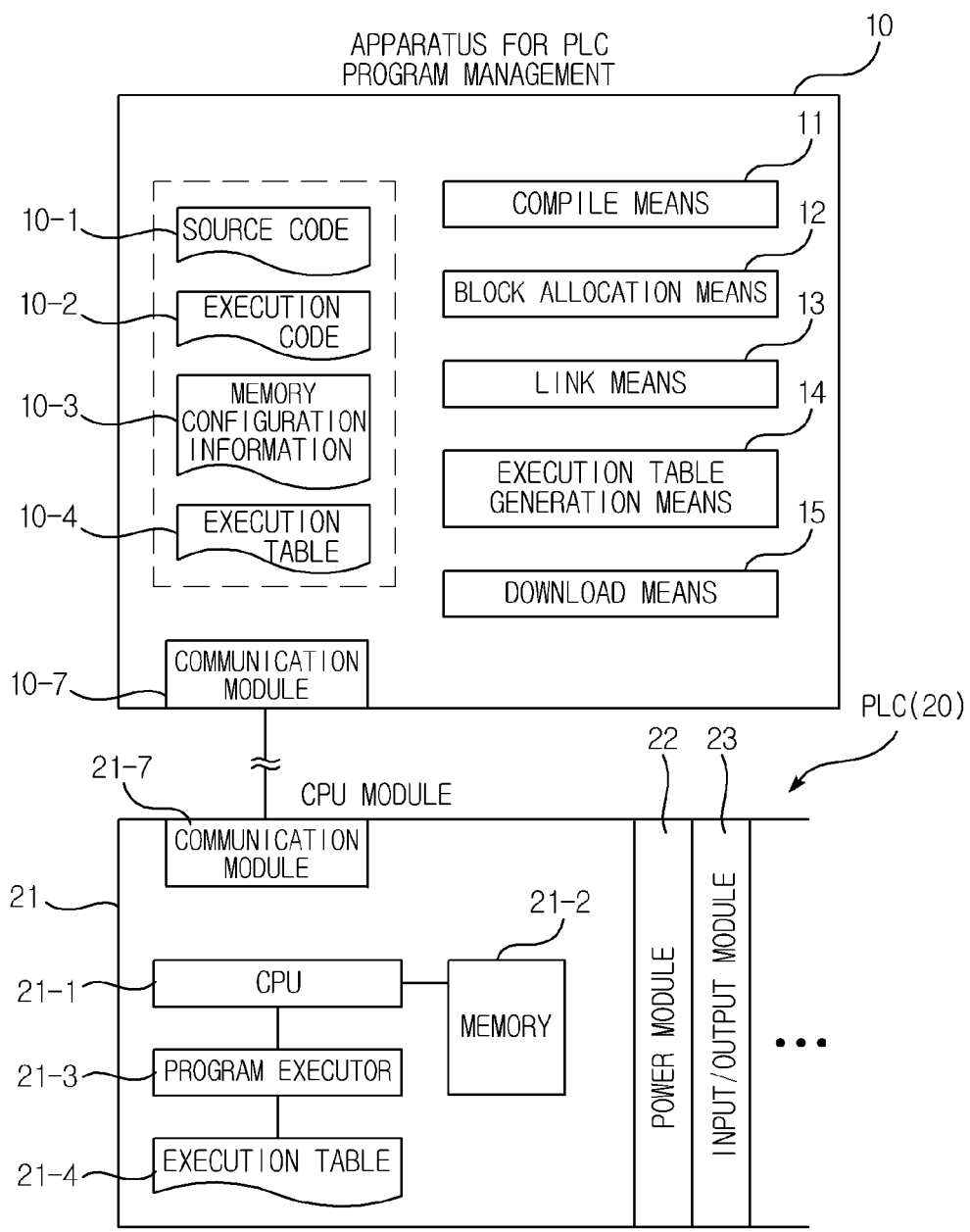
FIG. 1 is a schematic block diagram illustrating an apparatus for program management of PLC and a CPU module according to an exemplary embodiment of the present disclosure.

Referring to FIG. 1, a PLC (Programmable Logic Controller) is interconnected with an apparatus for user program management (10, hereinafter referred to as "apparatus"), which is a separate external device.

The apparatus (10) in the present disclosure defines a device configured to manage a program applicable by a user to a PLC (20) regardless of its nomenclature, and a user program may be downloaded the PLC (20). The apparatus (10) can perform various roles for operating and managing the PLC (20) as long as the apparatus can perform a function related to a program management hereinafter explained.

The apparatus (10) may be installed with an application tool configured to perform such functions as preparation of ladder program by a user, and enablement of downloading to the PLC (20) by compiling the prepared program.

The apparatus (10) may be configured by a computer device such as a desk top computer or a notebook computer. The apparatus (10) may be installed with application tools configured to perform functions such as preparation of ladder program by a user, and enablement of downloading to the PLC (20) by compiling the prepared program.

The PLC (20) may include various types of modules such as a CPU module (21), a power module (22) and an I/O (Input/Output) module.

The CPU module (21) performs a function of a basic unit of PLC (20), and may include an operation processor such as a CPU (Central Processing Unit (21-1) and a memory (21-2) recorded with execution code of a user program. The CPU module (21) defines a main control module configured to manage the PLC (20) by executing a main operation program of the PLC (20) regardless of its nomenclature. FIG. 1 illustrates an example where the apparatus (10) and the CPU module (21) are interconnected through each communication module (10-7, 21-7). The apparatus (10) and the CPU module (21) may communicate through various communication methods such as serial communication and Ethernet.

Figure 2:
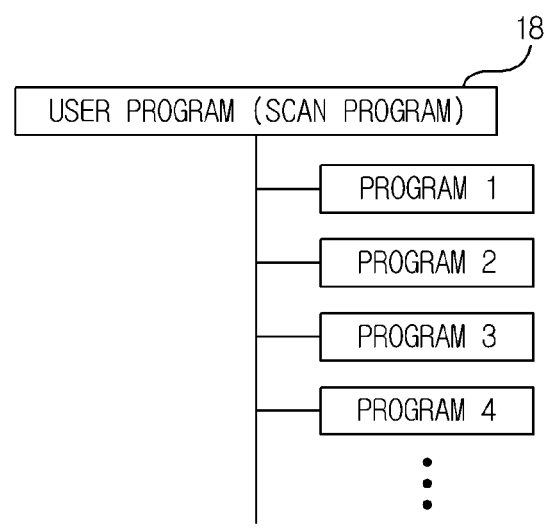
FIG. 2 is an example of a user program.

Referring to FIG. 2, a user program (18) of PLC (20) may generally include various low-level programs such as a program 1, a program 2, a program 3 and a program 4, and a source code of a user program prepared by a user under a PLC program development environment may be downloaded to the PLC (20) by being compiled in an execution code.

The apparatus (10) according to the present disclosure may include a compile means (11), a block allocation means (12), a link means (13), an execution table generation means (14) and a download means (15).

The compile means (11) may function to generate an execution code (10-2) by compiling the source code (10-1) of a user program, where the execution code defines a type of code processible by an operation processor of PLC (20).

The block allocation means (12) may function to allocate a memory block on an execution code with reference to memory configuration information (10-3). That is, the block allocation means (12) may search a memory block adequate to size of execution code compiled by the compile means (11), and allocate the searched memory block to a relevant execution code.

The memory configuration information may define information indicating what memory blocks a memory is to be configured with. Each memory block may have various sizes instead of having a same size. To be more specific, the size of memory block may be configured with an integer of preset basic size (N).

Figure 3:
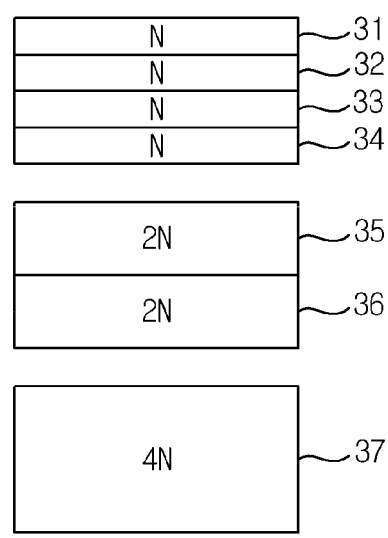
FIG. 3 is an example for explaining memory configuration information.

FIG. 3 is an example for explaining memory configuration information, where the memory block has a size of N, 2N, 4N, etc., and the memory configuration information may be configured to have a structure including four memory blocks (31~34) whose size is N, 2 memory blocks (35, 36) whose size is 2N, and one memory block (37) whose size is 4N in the order of address order of memory.

The memory configuration information may be variably configured in any manner according as what structure a memory is configured by block unit.

The link means (13) may function to arrange an execution code to a position of a memory block allocated through the block allocation means (12). That is, an execution code of each user program may be so arranged as to be positioned at a memory address actually positioned through the link means (13). For example, when the memory block (35) of first 2N size of FIG. 3 is allocated at a certain execution code, the link means (13) is configured in a manner such that the execution code is positioned at the memory block (35).

The execution table generation means (14) may generate an execution table (10-4) containing execution order and position information of each execution code. Although each execution code is arranged at a memory block allocated by the block allocation means (12), the position of the memory block allocated by the block allocation means (12) may be arbitrarily determined by size of execution code and current memory use state, and therefore there is no guarantee that the execution code of each user program is arranged in the execution order thereof. However, the execution code must be executed in an order desired by a user when actually executed by the PLC (20), and therefore, information on program execution order and execution position of each program is required, the role of which is performed by the execution table.

Now, referring to FIG. 4, an example of execution table will be described.

A user program in the execution table is formed with a program 1, a program 21, a program 3 and a program 4, and the block allocation means (12) allocates the program 1, the program 21, the program 3 and the program 4 to a memory block 5, a memory block 7, a memory block 1 and a memory block 2 respectively.

Then, there is no chance of the programs 1~4 of being executed in order, because the link means (13) arranges the program 3 to the memory block 1, the program 2 to the memory block 7, the program 3 to the memory block 1 and the program 4 to the memory block 2 respectively.

To this end, the execution table (10-4) is recorded with program position information for execution of the program execution order and related order, where each program can be sequentially executed according to desire of a user by using the information. The execution table (10-4) may include various pieces of information necessary for designating the program execution order and position. For example, the execution table (10-4) may include start position of the memory block and information on size of execution code arranged on relevant memory block as well. The download means (15) may download the execution code processed by the link means (13) and the execution table generated by the execution table generation means (14) to the PLC (20).

Meanwhile, when the user program already allocated with the memory blocks is modified, the block allocation means (12) may compare the size of the modified execution code with the size of memory block allocated to the execution code prior to modification, may allocate the memory block as it is, or may allocate a new memory block.

Figure 5:
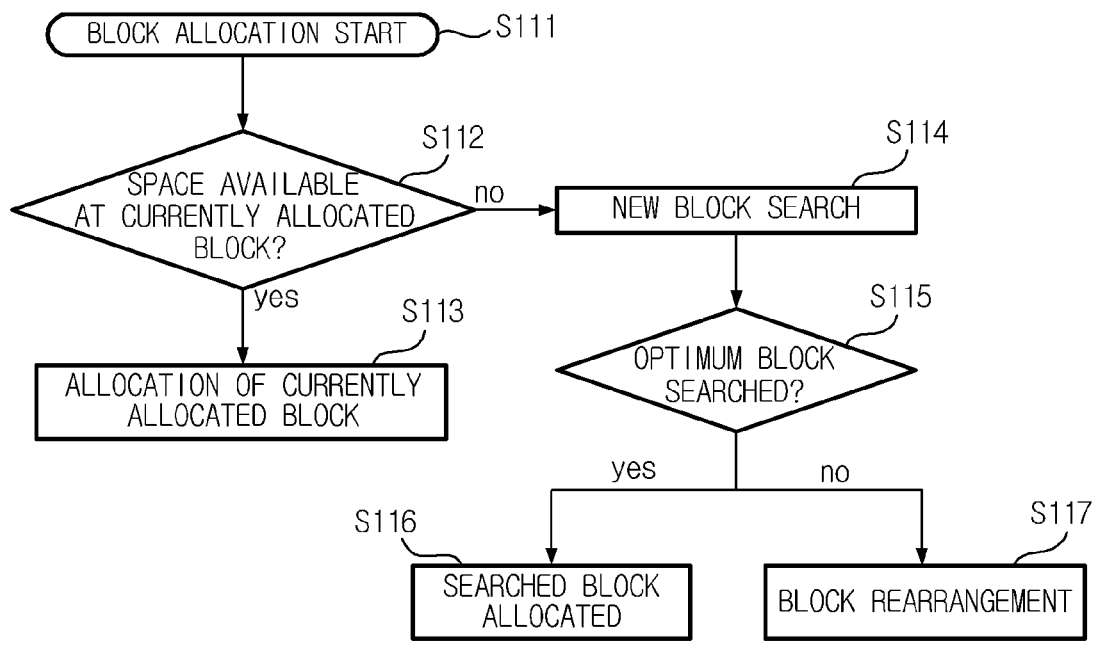
FIGS. 5 and 6 are detailed examples of a method for allocating memory blocks when a user program is modified.

Referring to FIG. 5, an operation of block allocation means (12) will be exemplified when a user program is modified.

The block allocation means (12) determines if there is a sufficient space to load a modified execution code on a memory block allocated to a relevant user program (S112), when the modified execution code is changed to an execution code through the compile means (11) to be block-allocated (S111).

As a result of the determination at S112, when there is a sufficient space to a current memory block, the current memory block is allocated as it is (S113), and when there is no sufficient space to the current memory block, a process of searching for a new memory block is progressed (S114).

As a result of performing the process of searching for new memory block, when a new memory block is searched (S115), the new memory block is allocated (S116), and a memory block is re-arranged when the new memory block cannot be searched (S117). The rearrangement of memory block means that memory blocks are all re-allocated on each execution code.

Figure 6:
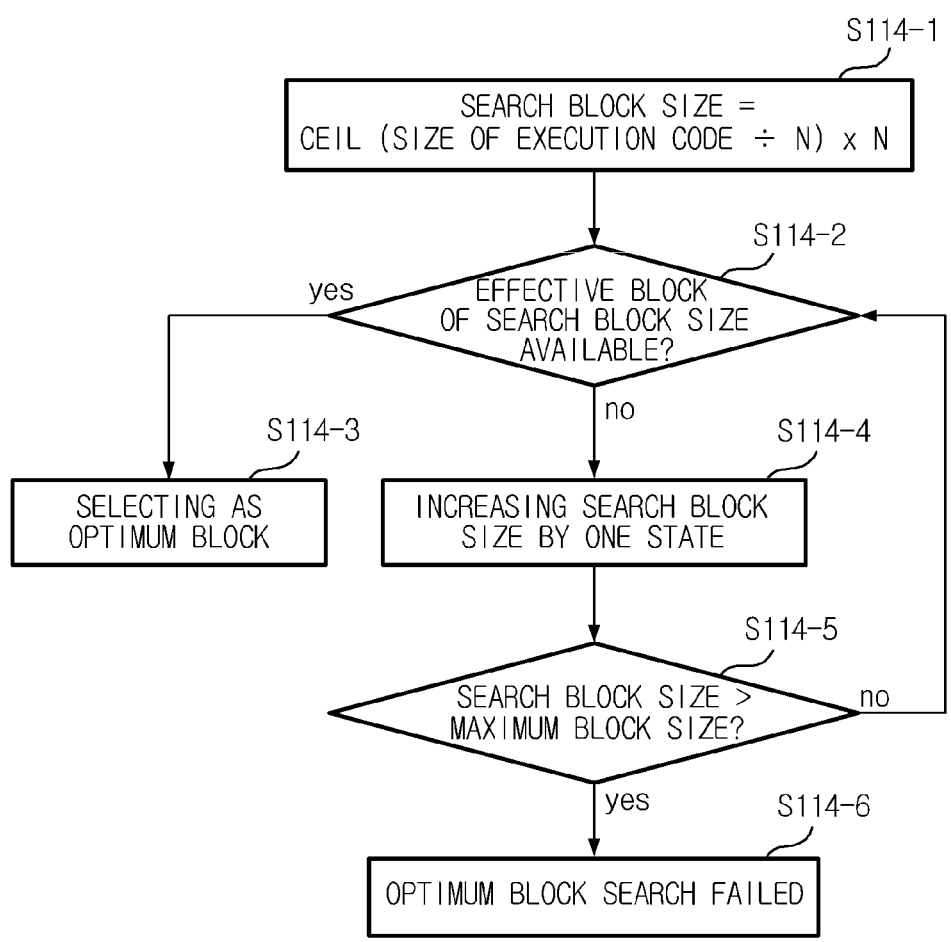

FIG. 6 shows an example regarding the process (S114) that searches for a new memory block in FIG. 5, where size of memory block is assumed to be an integer number of preset basic size (N) as illustrated in FIG. 3.

First, the block allocation means (12) seeks a size of search block according to '"CEIL (modified size of execution code÷N)×N', where, CEIL (x) (i.e., CEILING (x)) is a ceiling function representing a minimum integer number larger than x (S114-1).

Furthermore, determination is made as to whether an effective memory block (memory block of useable state) in search block size remains (S114-2). When it is determined that an effective memory block in the search block size currently remains, then, the step of S116 of FIG. 5 is performed. However, when it is determined that an effective memory block in the search block size does not currently remain, the search block size is increased by one stage (S114-4), and flow proceeds to step S114-2, where, the process of determining whether an effective memory block of search block size still remains is repeated until a value of search block size becomes greater than a regulated maximum block size (S114-5).

When the effective block memory cannot be searched, it leads to failure to memory block allocation, and the step of S117 of FIG. 5 is performed. That is, when a new memory block is not searched, the block allocation means (12) re-allocates a memory block to the execution code of each user program.

When a certain user program is modified, rearrangement is realized by the link means (13), the rearranged execution code and an execution table modified thereby are generated again and downloaded to the PLC (20) through the download means (15).

Meantime, the CPU module (21) may include a program executor (21-3) that sequentially and repetitively executes execution codes of several user programs recorded in the memory (21-2), and the CPU module (21) may maintain an execution table (21-4) downloaded from the apparatus (10). Furthermore, the CPU module (21) may load the execution code of the user program downloaded from the apparatus (10) on its own memory (21-2). Thereafter, the program executor (21-3) may sequentially execute the execution code of the memory (21-2) with reference to the execution table (21-4).

Figure 4:
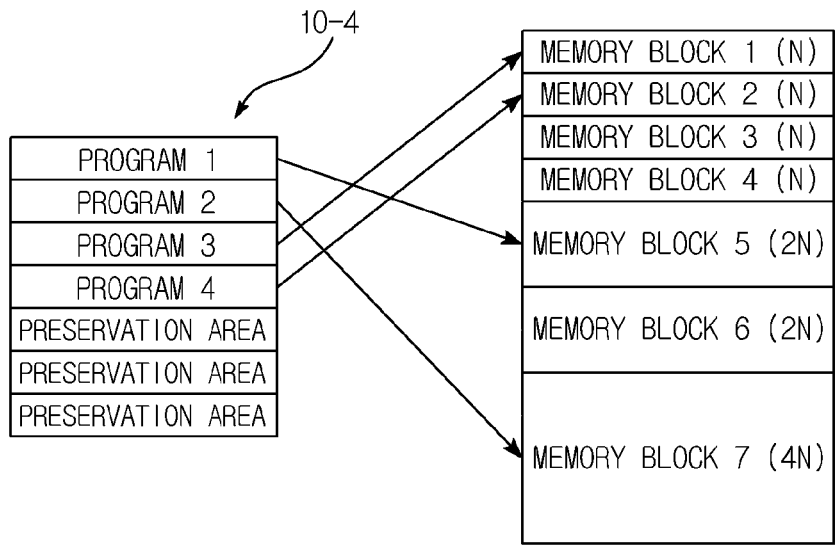
FIG. 4 is an example for explaining memory block allocation and execution table.

As explained through the example of FIG. 4, the program executor (21-3) may execute the user program (execution code) in an actual program execution area of the memory (21-2) by using the information stored in the execution table.

In view of the example of FIG. 4 in a memory aspect, although the program executor (21-3) is sequentially loaded with the program 3, the program 4, the program 1 and the program 2, when executing with reference to the order stored in the execution table, execution is made in the order of execution code recorded on the memory blocks 5, 7, 1 and 2, and the execution is made in the order of program 1 to program 4 in the long run.

That is, the program executor (21-3) can always execute programs in a correct order, because the memory position recorded with programs to be executed by the execution table is designated in accordance with the order. Furthermore, the execution table may include a preservation area to non-used memory blocks, and therefore, the PLC (20) can easily add a new user program in the midst of operation when using the preservation area.

For example, the program executor (21-3) may execute a newly added program 5 after execution of program 4, when, for example, the new added program 5 is downloaded from the apparatus (10), as in the example of FIG. 4, to be added to the memory block 6 of the memory (21-2), and a first preservation area of the execution table is added with information thereof.

The previous illustrative description of the present disclosure is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

The exemplary embodiments of the present disclosure have industrial applicability in that a memory space can be efficiently used by allocating a memory block adequate to size of user program, and to modify/add an executing user program without stopping an operating PLC.

The invention claimed is:

1. An apparatus having a processor, for program management of a PLC (Programmable Logic Controller) in order to provide a plurality of execution codes of a plurality of user programs using a CPU module managing the PLC by executing a main operation program of the PLC, the apparatus for program management of the PLC performing steps of:

generating the plurality of execution codes of the plurality of user programs by compiling a plurality of source codes;

allocating a memory block adequate to a size of each of the plurality of execution codes based on memory configuration information as to what memory blocks a memory is formed with;

arranging each of the plurality of execution codes at a position of the memory block allocated;

generating an execution table recorded with execution order and position information of each of the plurality of execution codes; and downloading the plurality of execution codes and the execution table to the CPU module of the PLC, wherein the execution table includes an area stored with the execution order of each of the plurality of execution codes and the position information of each of the plurality of execution codes, wherein the execution table further includes a preservation area to a non-used memory, and wherein when a new user program is added during an execution of the plurality of user programs, the new user program is added to the preservation area to regenerate a modified execution table, and wherein the size of the memory block is formed with an integer of preset basic size (N), where the apparatus searches an effective memory block, starting from a first size obtained by:

calculating 'CELL (modified size of execution code÷N), which outputs a first value, and multiplying the first value with N, which outputs the first size, wherein CEIL (modified size of execution code÷N) is a function representing a minimum integer number larger than a second value obtained dividing the modified size of the execution code by N, and wherein responsive to determining that the effective memory block is not available at the first size, the effective memory block is increased by the preset basic size (N) until the size of the effective memory block becomes greater than a regulated maximum block size.

2. The apparatus of claim 1, wherein the the apparatus further allocates the memory block as it is or a new memory block in response to the size of a modified execution code of the modified user program and the size of a memory block allocated to the modified execution code prior to the modification.

3. The apparatus of claim 2, wherein the apparatus further reallocates the memory block relative to each of the plurality of execution codes based on the memory configuration information, when no new memory block can be found.

4. The apparatus of claim 1, further comprising the CPU module of the PLC receiving the downloaded plurality of execution codes and the execution table and sequentially executes the plurality of execution codes with reference to the execution table.

* * * * *